Dec. 9, 1958  J. ROSENBERG ET AL  2,864,010
RAPID TRAVERSE SYSTEM
Filed Oct. 7, 1957  2 Sheets-Sheet 1

INVENTORS
JACK ROSENBERG
NORMAN L. OLSON
BY
Lyon & Lyon
ATTORNEYS

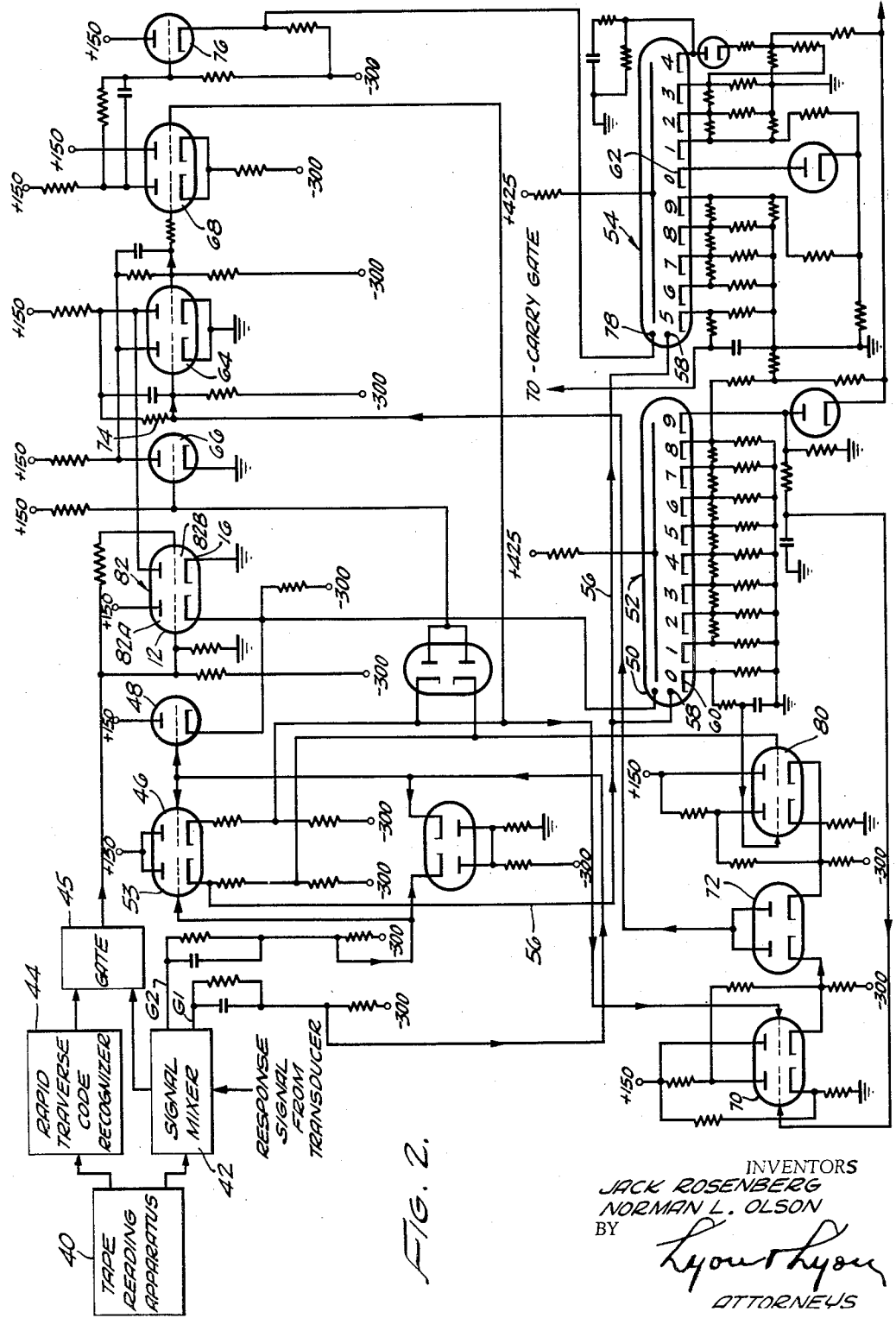

United States Patent Office 2,864,010
Patented Dec. 9, 1958

2,864,010

RAPID TRAVERSE SYSTEM

Jack Rosenberg, Pacific Palisades, and Norman L. Olson, Los Angeles, Calif., assignors, by mesne assignments, to General Dynamics Corporation, Rochester, N. Y., a corporation of Delaware Application October 7, 1957, Serial No. 688,714

7 Claims. (Cl. 307—149)

This invention relates to automatic control systems and, more particularly, is an improvement in digital servoloops which are employed in such automatic control systems.

Several machine-tool automation systems have been proposed wherein there is provided apparatus whereby a recording can be made from data upon a medium such as paper tape or magnetic tape, which represents instructions or commands which can be given to other apparatus, in response to which the operation of a machine tool may be controlled. For example, an article in the magazine Automatic Control, on pages 22–25, entitled "Digital Electronic Path Control," by Jack Rosenberg, published in April 1956, by Reinhold Publishing Corp., New York, N. Y., describes such an arrangement. The recorded information comprises pulses representative of incremental displacements required along co-ordinate axes in order to provide a resultant path which corresponds to the required relative motion path of a workpiece and a machine tool to obtain a desired result on said workpiece.

The portion of the apparatus operated in response to the recording is known as the control unit portion of the system and is, in effect, a digital servoloop. This apparatus includes a reversible counter, to which control pulses are applied, a digital-to-analog converter for converting the digital contents of the counter to a voltage representative thereof, apparatus for driving the workpiece and cutting tool relative to one another responsive to the output to the digital-to-analog converter, and a motion transducer which, for every increment of motion, provides a signal which is fed back to the reversible counter for the purpose of being subtracted from the count entered therein by the control pulses. The apparatus just recited controls one co-ordinate of motion. To control motion along three different co-ordinates, the apparatus recited must be provided three times.

On many machine tools, it is oftentimes required to provide a high feed rate to perform what is termed "rapid traverse" operation. Such operation is employed, for example, when moving a table over an appreciable distance without performing any cutting, as, for example, when a cutting path has been completed and the next path should start at the other end of the table. While cutting feed rates generally lie below 50″ per minute, a rapid traverse feed rate may occur at up to 300″ per minute. Since the described machine-tool automation system controls the feed rate by the pulse information recorded on tape, it should be apparent that such systems require control information to be recorded, even during the rapid traverse time, when no cutting actually occurs. In order to increase the feed rate of the machine tool, it is possible to increase the speed of the record playback system; however, this is not a very satisfactory arrangement, since the design parameters of a system are usually made, so that the reading apparatus operates at its optimum speed, and an increase thereof results in errors in reading or unreliable operation of the system, and uses excessive amounts of tape.

An object of the present invention is to effectuate rapid traverse operation within a digital servoloop of a machine-tool control.

Another object of the present invention is to effectuate rapid traverse operation of a machine tool directed by information recorded on tape without changing the speed of operation of the reading apparatus.

Another object of the present invention is to provide a novel and useful rapid traverse system in apparatus controlled by a digital servoloop.

As previously described, to obtain a workpiece with desired contours obtained, for example, by controlling a milling machine, the path-control information required to be followed by the milling machine table in order to produce these desired contours is recorded on tape. The tape is then played back into a milling machine tool control unit, which includes a servoloop of the digital type. The resultant workpiece dimensions will bear what may be termed a one-to-one relationship with respect to the recorded control information, and thereafter any time the recorded information is played back into the digital servoloop, the workpiece resulting will have dimensions with a one-to-one relationship to the tape information. Sometimes it is desired to produce a workpiece whose dimensions are proportionately scaled in either a greater or a lesser manner with respect to the dimensions of the workpiece bearing the one-to-one relationship to the recorded information.

A further object of this invention is to provide a convenient means whereby it is possible to obtain results which bear different proportional relationships with respect to the recorded information.

These and other objects of the invention are achieved within a digital servoloop of the general type described wherein provision is made, when a rapid transverse operation is desired, to feed command pulses to be counted by the error register in a manner so that each command pulse is equivalent to a greater number of command pulses than one. More specifically, an error register comprises a reversible counter which, for example, with a decimal counter, comprises a number of decades and in the case of a binary arrangement, comprises a plurality of binary stages. With respect to the decimal counter, the single pulse can be fed into the tens decade stage, or hundreds decade stage, instead of the units decade stage, so that the count change is ten or one hundred, instead of one. With respect to the binary counter, the pulse can be fed simultaneously to one or more of the binary stages to place them in condition to represent a count change greater than secured merely by the addition of a single count.

Since the digital servoloop operates in a manner whereby for every count in the error register, in response to a command pulse, a machine tool is commanded to move one increment of motion as the result of which a motion transducer associated therewith provides an output which is applied to the error register in a manner to subtract a count, by this invention the machine-tool is commanded to move in response to a single-command pulse more than one motion increment. Thus, if a decimal type of error register is employed and the single-command pulse is fed into the tens stage instead of into the unit stage, the machine tool is commanded to move ten increments of motion instead of one. Furthermore, since with the type of digital servoloop employed, there is a digital-to-analog conversion wherein the amplitude of the analog signal is determined by the size of the count in the error register and the speed at which the following servomotor is driven is determined by the amplitude of the signal applied thereto, the speed of operation of the machine tool is increased by means of this invention.

If it is desired to use this invention for the purpose of increasing the proportions of a workpiece to be machined instead of having these in a one-to-one relationship with respect to the information recorded, then, instead of the arrangement just described being used for rapid traverse, it may be employed for the purpose of actually machining the workpiece, whereby its dimensions will be increased in the proportion determined by the point of feed of the command pulse into the error register. If it is desired to reduce the proportions of a workpiece to be machined, then this may be performed by feeding the pulses obtained from the motion transducer into the error register, so that in response thereto, the count changes by more than one. This will require the provision of more than one command pulse, in order to restore the error register to zero, as a result of which the size of the dimensions being machined on the workpiece are reduced.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 2 is a circuit diagram of an embodiment of the invention; and

Figure 1:
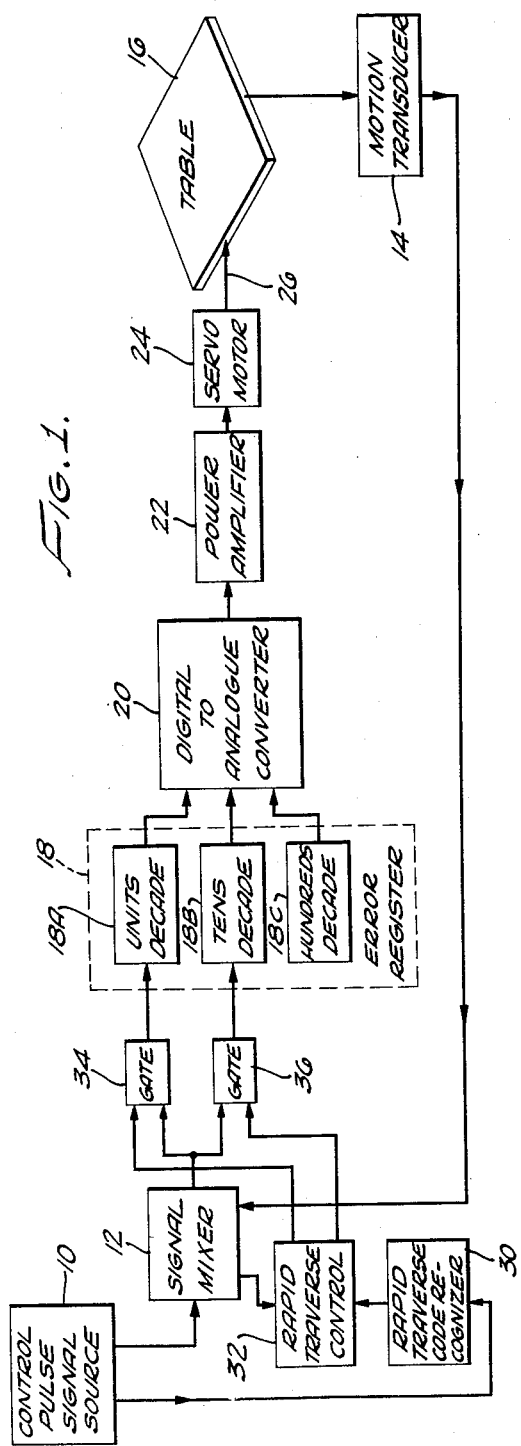
Figure 1 is a block diagram of the invention employed in a digital servoloop.

Reference is now made to Figure 1, which shows a block diagram of the invention. By way of illustration and explanation of the principles involved herein, it will be assumed that the machine tool which is to be controlled is a milling machine of the type wherein the cutting tool is fixedly supported above a table, upon which the workpiece is affixed. The table is movable separately and simultaneously along three co-ordinate axes, which enables the table to describe a path so that the workpiece carried thereon is milled to have a desired shape. In order to enable control along each coordinate axes, three digital servoloops are employed. Figure 1 shows one of these digital servoloops.

The rectangle in Figure 1, which is labeled "control-pulse signal source" 10, refers to well-known tape-reading apparatus, or any other apparatus which provides the command signals in response to which the machine tool being controlled will move an increment of motion. In accordance with the prior-art teachings, the output of the control-pulse signal source is applied to a signal mixer 12. The function of this signal mixer is to prevent any conflicts arising, should the control-pulse signal source and a motion transducer 14, which is affixed to the table 16, simultaneously apply signals to the signal mixer. The signal mixer will hold one of these signals until operation in response to the other has been completed. The signal mixer also provides the function of applying the signal from the control-pulse signal source to the subsequent counter 18 in a manner to increase the count therein, and the signal from the motion transducer to the subsequent error register to decrease the count therein. Accordingly, the error register output is a count which indicates the extent to which the machine-tool table must be moved to satisfy the command represented by the number of control pulses in excess of the response pulses generated by the motion transducer 14.

The count condition of the error register is a digital manifestation which is converted by means of a digital-to-analog converter to a voltage whose amplitude is representative of such count condition, and whose polarity represents the sign of the count. The count sign determines the direction of motion. The output of the digital-to-analog voltage converter is applied to a power amplifier 22, the function of which is to convert this voltage to a current required to drive a servomotor 24. The servomotor drives a lead screw 26. The lead screw 26, in being driven, moves the table along a coordinate in a direction which is dictated by the sign of the count in the error register. The speed at which the servomotor is driven is a function of the amplitude of the power amplifier output. The length of time during which the servomotor drives the lead screw is a function of the duration of the output of the digital-to-analog voltage converter.

The motion transducer 14 performs the function of detecting increments of motion of the table and generates signals indicative thereof which are fed back to the signal mixer with a sense representative of the direction of motion of the table. The motion transducer may be an optical diffraction grating, or a magnetically actuated device which is driven directly from the table. Alternatively, the motion transducer can be an antibacklash step-up gear train which is driven from the lead screw 26 and which, in turn, will drive an instrument synchro-transformer, which signals back the motion increments of the machine-tool table.

The operation of this system is as follows: The control-pulse signal source applies a command pulse to the signal mixer, which then applies it to the error register. The count of the error register is converted by the digital-to-analog converter to a voltage having an amplitude representative of the count in the error register. Polarity of this voltage is also indicative of whether or not the count is positive or negative. The power amplifier converts this voltage to current having a corresponding amplitude and polarity. The servomotor is driven by the output of the power amplifier, turning the lead screw which moves the table. Upon the table having been moved an increment of motion, the extent of which has been predetermined, the motion transducer sends back a response pulse to the signal mixer, which applies it to the error register in a manner to diminish the count thereof. When the error register indicates zero, the table motion is stopped.

The arrangement thus far described is known and is not being claimed. It should be appreciated from this description, however, that there is a one-to-one correspondence between the number of command pulses obtained from the control-pulse signal source and the extent of the motion of the machine-tool table. If, at the completion of a pass at a workpiece, it is desired to position the table at some distance from where the last pass was completed, command pulses must be supplied to order the table to move through the required distance. These command pulses are recorded on tape. Acceleration of the motion of the table may be obtained by increasing the reading operation, or possibly by switching in auxiliary apparatus which can generate more than one pulse for every input pulse, but this introduces undesirable effects due to transient changes in signal level which can provide erroneous operations, and also can cause instability. A preferred arrangement for effectuating rapid traverse is shown in Figure 1. The error register 18 is shown as being a reversible decimal counter containing three decades, a units decade 18A, a tens decade 18B, and a hundreds decade 18C. This is not to be construed as a limitation upon the invention, since the principles which are set forth herein are also applicable to counters operating in binary or other number systems.

In the course of programming data which is to be recorded on tape for the subsequent utilization in controlling machine-tool operation, the programmer knows when a rapid traverse operation should be performed. The reason he knows this is that the data used in preparing the tape is derived from drawings of the workpiece, or from other information whereby he is aware of the fact that at the completion of a pass, a repositioning of the machine-tool table is required without a cutting operation being performed. With this knowledge the programmer can record the fact that a rapid traverse operation is to commence by a special code marking on the recording medium. Such code marking may be printed in auxiliary channels on magnetic or paper tape, each time a command pulse is recorded which is employed in the region of rapid traverse. Alternatively, a rapid traverse code marking may be used to mark the beginning of the desired rapid traverse region on the tape, and a second code marking may be employed to indicate the end of such rapid traverse region. Either a special code may be employed for these purposes, or the required rapid traverse operation may be simply indicated by a continuous series of holes in paper tape, or a continuous recording signal on magnetic tape. Any of these expedients for signifying a desire for an operation to commence and terminate on a recording medium are well known in the information-handling field, and it is not believed necessary to complicate this application with details as to how to record a signal indicative of a desire that an operation commence and another signal indicative of the desire that such operation terminate.

When the information from the control-pulse signal source indicates that a rapid traverse operation is required, this is recognized by apparatus denoted in Figure 1 as rapid traverse code recognizer 30. As previously indicated, this may merely be circuitry such as a Schmitt trigger circuit, which is driven from one to the other conditions of stability as long as there is applied to its input a signal having sufficient amplitude. Such signal can be the succession of holes in the rapid traverse region of the paper tape or a continuous magnetically recorded signal in a rapid traverse region of magnetic tape.

The output of the rapid traverse code recognizer is applied to a circuit called a rapid traverse control 32. When not actuated, the output from the rapid traverse control enables a gate 34 to pass output from the signal mixer directly to the units decade 18A in the error register 18. When actuated, the rapid traverse control 32 closes a gate 34 and opens a gate 36, which enables output from the signal mixer to be applied to a tens decade 18B in the error register 18. In order that the rapid traverse control circuit 32 be actuated, it is required that an output be received from the rapid traverse code recognizer and, also, that an output be received from the signal mixer. The output from the signal mixer is actually a pulse from the control-pulse signal source which is to be applied to the error register which follows. The output of the signal mixer, which is applied to both gates 34 and 36, is of course either a command-pulse signal, or a response-pulse signal.

Since the signal-mixer output to the rapid traverse control circuit 32 only occurs in the presence of a command-pulse signal, the gate 36 is enabled only in the presence of a command-pulse signal, and, as a result, response signals will pass into the error register through gate 34. In view of the fact that the command-pulse signal during the rapid traverse region is applied to the tens decade and the response-pulse signal is applied to the units decade, the effect of a command pulse applied to the system is the same as the effect of ten command pulses previously applied to the system. This will be appreciated from the fact that ten response pulses are required to drive the error register back to its zero-count condition for every single command pulse applied to the error register. Since the digital-to-analog converter, for every command pulse, provides a voltage ten times greater than before, in the rapid traverse region, the speed of the servomotor is increased, although not necessarily ten times. Of course, in view of the fact that each pulse from the control-pulse signal source causes ten times as great a travel within the rapid traverse regions, one-tenth the number of control pulses previously recorded should be recorded in the rapid traverse region. The rapid traverse control circuit 32 may be a relay, or an And gate which requires coincidence of two inputs to produce an output. The gates 34, 36 may be any of the well-known And gates, such as those shown in the book Electronics, published in 1949 by McGraw-Hill Book Company, pages 118–120.

According to the preceding description, in accordance with this invention, a rapid traverse is effectuated, where required, by feeding the command-pulse signal into the error register in a manner to increase the count in the error register by a factor which is determined by the feed-in point. The response signal is not fed into the same portion of the error register as the command signal, in order to maintain accuracy in control over the motion of the table. Since in the arrangement described the response signal is fed into the units decade with the command signal being fed into the tens decade, there is a multiplication effectuated of the response to each command pulse. The extent of such multiplication is determined by the decade into which the command pulse is fed. The feed rate of the table, as previously explained, is determined by the amplitude of the signal driving the servomotor. Thus, the feed rate during the rapid traverse interval may be readily established by the point at which the command pulse is injected into the error register. At the termination of the rapid traverse region on the tape serving as a source of control-pulse signals, gate 34 is opened and signals from both the control-pulse source and the motion transducer are thereafter fed into the error register at its usual input, which in the case of the decimal counter is the units decade.

Reference is now made to Figure 2, which is a circuit diagram of an embodiment of this invention which was constructed within a digital servoloop of the type described. This arrangement included magnetic-tape reading apparatus 40, which reproduced command-pulse signals for each co-ordinate of motion to be controlled. As in Figure 1, in order to simplify the required explanations, the apparatus for controlling only one co-ordinate of motion will be shown. It will be understood that one set of this apparatus is required for each motion co-ordinate to be controlled. Thus, the output of the tape-reading apparatus 40 is applied to a signal mixer 42 and also to a rapid traverse recognizer 44. The signal mixer 42 has the same structure as the one shown in Figure 1, and, also, the rapid traverse code recognizer may also be of the same type as the one shown in Figure 1. Another input to the signal mixer 42 is the error signal from the motion transducer, not shown here.

In the embodiment of the invention to be described, a decimal error register was employed. Each decade stage of this error register comprises a tube, known as a glow-transfer tube, which is a gas tube having a single anode surrounded by ten main cathodes. Between each two of the main cathodes are two intermediate guide cathodes. The tube operates on the principle that the ionization, or starting voltage, of gas-filled tubes is lowered if ions or electrons are already present in the anode-cathode gap. Under these conditions, a glow discharge can then be made to move from one cathode to an adjacent one by means of a relatively small negative voltage pulse on the new cathode, provided that electrons, or ions, are able to diffuse into this new anode-cathode gap. Thus, to move the glow discharge from one main cathode to the next one, first, a negative voltage pulse is applied to an adjacent guide, followed by the application of a second voltage pulse to an adjacent guide, and thereafter the removal of the first voltage pulse from the first guide. When the second voltage pulse is removed from the second guide, the beam then transfers to the nearest cathode, which is the cathode adjacent to the second guide. The beam can be made to return to the cathode from which it started by reversing the sequence of application of the two negative pulses. Thus, in the glow transfer counting tube, the glow, or beam, may be transferred from main cathode to main cathode by sequencing the application of negative pulses to the intermediate guide cathodes. The direction of transfer is determined by the one of the two guide cathodes which receives the first pulse. This tube is commercially purchasable, for example, from the Sylvania Electric Products, Inc., where it is designated as Type 6910.

In order to minimize the number of connections required, every other one of the intermediate guide cathodes are brought out to a first guide terminal, and the remaining ones of the guide cathodes are brought out to a second guide terminal. By applying a pulse to first one and then the other of these guide terminals, the glow, and, consequently, the count of the tube can be made to increase or decrease. When the glow is present on any one of the cathodes, that cathode provides a positive voltage output.

In an application for a Control Circuit, filed November 13, 1956, Serial No. 621,636, by Jack Rosenberg et al., which is assigned to a common assignee, there is described and claimed a signal-mixer arrangement wherein, in response to a command pulse or an error signal from the transducer, an output is provided consisting of two pulses, one of which is applied to the first guide of an error register, and the other to the second guide of the error register. Of course, the order of appearance of these two pulses determines whether or not the count in the error register is advanced or diminished. From the information contained in either the command pulse or the response pulse, the signal mixer properly establishes the order of the two output guide pulses. Thus, the output of the signal mixer 42 would be two pulses, the order of occurrence of which determines whether the following error register will increase or decrease the count contained therein.

For the sake of convenience in referring thereto, the guide-1 pulse will be designated as a G-1 pulse hereafter, and guide-2 pulse will be designated as a G-2 pulse hereafter. For operation where rapid traverse is not desired, the G-1 pulse is applied to the grid of a tube 46 and the grid of a tube 48. Both of these tubes are cathode-follower tubes, and in view of the fact that a negative pulse is applied to their grids, this negative pulse will be also derived from their respective cathodes. The output from the cathode of tube 48 is applied to the G-1 terminal 50 of the glow tube 52.

The G-2 pulse from the signal mixer is applied to the grid of a cathode follower tube 53. Two outputs are derived from the grid of cathode-follower tube 53, one of which is applied to a bus 56, which may be considered as the guide-2 bus, and is connected to the second guide terminals 58 of all the glow tubes in the error register. From the circuit described, it should be apparent that if the G-1, G-2 pulses appear in that order, the glow tube 52, which is a units decade, will advance the glow from each one of its main cathodes 60, designated by the numbers 0 through 9.

For the purposes of simplifying the explanation, without, however, detracting from the information required, a decade-reversible counter having only two stages, 52, 54 is shown. It will be understood that more than two stages, or decades, can be used where required. When the G-1, G-2 pulses appear in reverse order, then the units decade count is reduced; that is, the glow is transferred from a higher-order cathode to a lower-order cathode. When the units decade has reached the count of 9 the next count which must occur is that of 10. To represent the count of ten, the decimal decade 54 must have the glow exist on its number one cathode, and the units decade 52 must have the glow exist on the number zero cathode. Thus, it is required that when the units cathode decade reaches the count of 9 and another pulse to increase this count has been received, a mechanism for carryover must be provided.

The number 9 cathode of the decade 52 will be positive when the glow exists between it and the anode. This positive signal is applied to the grid of a tube 70. This tube becomes conductive and, as a result, a negative output is derived which is applied to one cathode of a double diode 72. This enables the diode to draw current through the resistor 74, whereby a pulse is applied to the flip-flop 64, which can drive it from its set to its reset condition. A tube 66 has its anode coupled to one anode of flip-flop 64 to maintain the carry flip-flop 64 in its reset condition in the absence of a signal applied to the flip-flop from the diode 72. The set output of the flip-flop 64 is applied to one grid of the double-triode And gate 68. In view of the common cathode coupling of the two triodes in the And gate 68, no output can be derived unless a G-1 pulse is applied to the other grid. Such G-1 pulse, if present, is derived from the cathode of tube 46. This permits an output from the And gate 68 to be applied to the cathode-follower tube 76. The output of the cathode-follower tube 76 is applied to the G-1 guide terminal 78 of the tens decade register.

The G-2 pulse is applied to the G-2 terminal of the tens decade 54 from the bus 56. The decade 54 will then have the glow transferred from its number zero to its number one cathode, and the decade 52 will meanwhile have transferred its glow from the number nine cathode to the number zero cathode. If when the units decade indicates the count of nine a G-2 pulse arrives before the G-1 pulse, then instead of a carryover operation occurring the units decade must be reduced by one count. In that event, the set signal is removed from the carry flip-flop 64, whereby the plate follower tube 66 can reset the carry flip-flop 64 and no carryover operation will occur.

In the event that the number in the error register is diminished by ten counts, then it is necessary to reduce the value in the tens counter by the one count and to establish the units counter with the glow at the number nine cathode. For example, in passing from the count 20 to 19, the glow in the tens register must be transferred from two to the one cathode and in the units register from the zero to the number nine cathode. As explained previously, in order to reduce the count in the counter, the G-2 pulse must precede the G-1 pulse. Therefore, when the cathode of tube 53 provides a G-2 pulse output, a second output is derived from a tap lower down on the cathode load resistor, which is coupled to the grid of a double-triode gate 80. The other grid of the double-triode gate is coupled to the number zero cathode of the units decade. If the units decade is in the zero count condition, when a G-2 pulse arrives, then the gate provides a negative pulse output to the second cathode of the double diode 72. This operates, as previously described, to set the carry flip-flop 64. The set output of the carry flip-flop is applied to the And gate 68. When the G-1 pulse arrives (this occurs after the G-2 pulse, since the subtraction process is now being performed), a pulse is applied from the And gate 68 to the cathode follower 76, which, in turn, is applied to the G-1 guide 78 of the tens stage of the counter. Since the G-2 pulse preceded the G-1 pulse, the tens stage of the counter will decrease its count by one. Likewise, the G-2 and G-1 pulses are directly applied to the units stage 52 of the counter, and it will change from a zero to a nine count condition.

The description of the operation of the error register thus far is not being claimed as novel here. The feature which enables rapid traverse operation with this circuit includes a gate 45, which may be similar to any of those double-triode gates described which provide a positive output pulse when both of its inputs are energized. Energization of its inputs require the application of an output from the rapid traverse code recognizer 44, as well as an output from the signal mixer 42, indicative of the fact that the command pulse, which has been received from the tape-reading apparatus, will be applied to the subsequent counter as G–1, G–2 pulses.

The output of the gate 45, consisting of a positive pulse, is applied to both grids of a double-triode 82. One triode 82A is cathode coupled to the tube 48. In the presence of the positive output derived from the cathode of tube 82A, the tube 48 is prevented from responding to the negative G–1 pulse. The other triode 82B is coupled as a plate follower to the set side of the carry flip-flop 64. Thus, when rendered conductive by the application of a positive pulse, tube 82B sets flip-flop 64, whereby the gate 68 is enabled to provide an output to cathode follower 76, which, in turn, applies a G–1 output pulse to the G–1 guide terminal 78 of the tens register 54. When the G–2 pulse follows, the tens register is advanced one count. By rendering tube 48 unresponsive to the G–1 pulse, application of a G–1 pulse is blocked from the units register 52, with the result that it is not advanced. Thus, during the rapid traverse region, each time a command pulse is received, the tens register is advanced and the units register is not. The response signals from the transducer, however, are fed to the counter in the usual manner.

Figure 3:
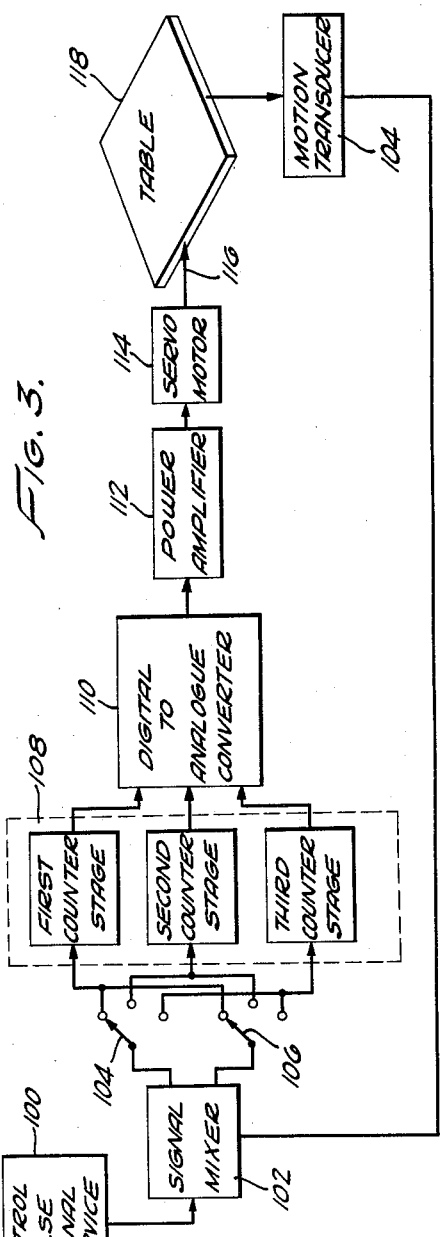
Figure 3 is a block diagram showing a further application of the invention in a digital servoloop.

From the description already given, it should become apparent that if a greater relationship than one-to-one is desired between the dimensions of the workpiece and the data on the tape, the arrangement just described can fulfill such a requirement. Each command pulse fed to the digital servoloop can be given a value, when required, equivalent to a factor times the motion increment previously executed in response to such command pulse. Reference is now made to Figure 3, which shows a block diagram of an arrangement whereby this may be effectuated. As before, a control-pulse signal source 100 supplies signals 102 to the signal mixer, which has the function of preventing any erratic operation, should signals arrive from the control-pulse signal source and the motion transducer 104 substantially simultaneously. The signal mixer also converts these signals to command signals to the error register 108, instructing it to add or subtract, as required. The output of the signal mixer comprises two separate signals, one of which is derived from the control-pulse signal source and the other is derived from the output of the motion transducer. Previously, the output of the signal mixer was applied to a common lead, which would have either command signals or response signals. The signal mixer 102, despite the fact that it has two outputs, has the identical circuitry as those previously described, except that the outputs responsive to an input-control signal or response signal are preserved separately. One of the signal-mixer outputs, say the command signal outputs, is applied to a selector switch 104; the other of the signal-mixer outputs is applied to a second selector switch 106. As shown, each selector switch has three taps, which are respectively connected to the first, second, and third counter stages of the error register 108. The output of the error register, as before, is applied to a digital-to-analog converter 110. The output of the digital-to-analog converter 110 is applied to a power amplifier 112; the output of the power amplifier is used to drive a servomotor 114, which, in turn, drives a lead screw 116 for moving the table 118 along a coordinate in a direction corresponding to the direction the lead screw is turning. The motion transducer 104 detects motion increments and provides an output pulse to the signal mixer, which operates as previously described to reduce the count in the error register from what was established therein by the command signals.

When the switches 104, 106 are set to apply the both signal-mixer outputs to the first counter stage, then the arrangement operates in well-known fashion to produce dimensions on the workpiece having a one-to-one-relation with the data provided by the control-pulse source. However, if, for example, the switch 104 is set on its second tap and the switch 106 still continues to apply the response signal output from the signal mixer to the first counter stage, then the operation of the arrangement is as was described in Figures 1 and 2, namely, that the command pulse which is derived from the control-pulse source obtains a greater number of motion increments in response thereto than previously, as determined by the point at which command pulses are applied to the register. Applying the command pulses to the tens stages causes multiplication of dimensions by ten. Applying the command pulses to the hundreds stage, by setting switch 104 to the third tap and maintaining switch 106 at the first tap, results in a multiplication of the dimensions recorded in the control-pulse signal source by 100.

Now, if the switch 106 is maintained in position to apply the command pulses to the first stage of the counter and switch 106 is operated to connect the response signals to the second or third stages of the counter, the opposite effect to that described will occur, namely, if a decimal counter is used and the second and third stages comprise the tens and hundreds stages, then connecting the output of the signal mixer occurring as the result of response signals to the tens stage reduces dimensions by one-tenth, or similarly, connecting the signal mixer output to the hundreds stage, reduces the dimensions by 100. If the counter is a binary counter, then dimension reductions by factors of two may be achieved in this manner and, similarly, by judicious operation of the selector switch 106, dimension multiplications by factors of two can be achieved. It will be appreciated that the operations of the switches 106, 106 may be manual or may be in response to supplementary programming to automatically increase or decrease the response to recorded control pulses not over the entire recording, but only for selected portions thereof. The switches 104, 106 are shown by way of illustration and manifestly may be readily replaced by those skilled in the art by their electronic equivalents.

Accordingly, there has been described and shown herein a novel, useful, and unique arrangement of a digital servoloop whereby a rapid traverse operation of a machine tool may be controlled. Also shown, using substantially the same technique as is required for rapid traverse, is an arrangement for increasing or decreasing the response of the digital servoloop to control pulses applied thereto.

We claim:

1. In a digital servoloop system of the type wherein a motion-command signal is applied to a reversible counter to effectuate a single count change, means are provided to execute motion responsive to the count established in the counter, and means are provided to generate a response signal from each motion increment executed and to apply said response signal to said counter to reverse the single count change due to a motion-command signal, the improvement comprising means to apply a signal to said counter to effectuate a count change greater than a single count change whereby the resultant motion executed by said means responsive to the count established in the counter exceeds that otherwise obtained by the application of a single signal to said reversible counter.

2. In a digital servoloop system of the type wherein a motion-command signal is applied to a reversible counter to effectuate a single count change, means are provided to execute motion responsive to the count established in the counter, and means are provided to generate a response signal for each motion increment executed and to apply said response signal to said counter to reverse the single count change due to a motion-command signal, the improvement comprising means to apply a motion-command signal to said counter to effectuate a count change greater than a single count change whereby the resultant motion executed by said means responsive to the count established in the counter exceeds that otherwise obtained by the application of a motion-command signal to said reversible counter.

3. In a digital servoloop system of the type wherein a motion-command signal is applied to a reversible counter to effectuate a single-count change, means are provided to execute motion responsive to the count established in the counter, and means are provided to generate a response signal for each motion increment executed and to apply said response signal to said counter to reverse the single count change due to a motion-command signal, the improvement comprising means to apply a response signal to said counter to effectuate a count change greater than a single count change whereby the resultant motion executed by said means responsive to the count established in the counter is less than that otherwise obtained by the application of a motion-command signal to said reversible counter.

4. The improvement in a digital servoloop system of the type wherein motion-command signals are applied to be counted to the lowest-order stage of a reversible counter having a plurality of stages, means are provided to execute motion responsive to the count established in the counter, and means are provided to generate a response signal for each motion increment executed and to apply said response signals to the first stage of said reversible counter to diminish the count established by motion-command signals comprising selectively operable means for applying motion-command signals to a higher order stage of said counter when it is derised to increase the results produced in response to a motion-command signal.

5. The improvement in a digital servoloop system of the type wherein motion-command signals are applied to be counted to the lowest order stage of a reversible counter having a plurality of stages, means are provided to execute motion responsive to the count established in the counter, and means are provided to generate a response signal for each motion increment executed and to apply said response signal to the first stage of said reversible counter to diminish the count established by motion-command signals, comprising means for applying motion-command signals to a higher-order stage of said counter when an increased motion response to a motion-command signal is desired, and means for applying response signals to a higher order stage of said counter when a decreased motion response to a response signal is desired.

6. A digital servoloop arrangement having provision for rapid traverse operation comprising a reversible counter having a plurality of serially connected stages of increasing order, a source of motion-command pulses, means for selectively applying motion-command pulses to one of said higher-order counter stages when a rapid traverse operation is desired, a digital-to-analog converter coupled to said counter to convert its output to an analog value, servomotor means to effectuate motion in response to said analog value, transducer means to provide a response pulse responsive to an increment of motion, and means to apply said response pulse to the lowest-order stage of said reversible counter.

7. A digital servoloop arrangement having provision for enlarging or reducing its response characteristics comprising a reversible counter having a plurality of serially connected stages of incerasing order, a source of motion-command pulses, means for selectively applying said motion-command pulses to the lowest-order stage of said counter when no enlargement of servoloop response characteristics is desired and to a higher-order stage of said counter when an enlargement of response characteristics is desired, a digital-to-analog converter coupled to said counter to convert its output to an analog value, servomotor means to effectuate motion in response to said analog value, transducer means to provide a response pulse responsive to an increment of motion, and means for selectively applying said response pulse to the lowest order stage of said counter when no reduction of servoloop response is desired and to a higher order stage of said counter when a reduction of response characteristics is desired.

No references cited.